United States Patent [19]
Novak

[11] 3,829,203
[45] Aug. 13, 1974

[54] FILM CASSETTE

[75] Inventor: Warren D. Novak, Chappaqua, N.Y.

[73] Assignee: The Mosler Safe Company, Hamilton, Ohio

[22] Filed: May 14, 1973

[21] Appl. No.: 360,360

[52] U.S. Cl................ 352/78 R, 352/156, 242/194, 242/71.2
[51] Int. Cl. .......................................... G03b 1/00
[58] Field of Search......... 352/156, 128, 78, 72, 73, 352/74, 75, 76; 242/71.1, 71.2, 76, 193, 194, 199, 200

[56] References Cited
UNITED STATES PATENTS

| | | | |
|---|---|---|---|
| 3,106,361 | 10/1963 | Boyer............................ | 242/71.2 X |
| 3,270,936 | 9/1966 | Selsted et al...................... | 242/76 X |
| 3,415,599 | 12/1968 | Winkler et al. ................. | 242/71.2 X |
| 3,537,780 | 11/1970 | Angenieux..................... | 242/71.2 X |
| 3,561,851 | 2/1971 | Martin ............................ | 352/78 R |
| 3,568,943 | 3/1971 | Robak............................ | 242/71.1 X |
| 3,677,494 | 7/1972 | Protas............................ | 352/156 X |
| 3,690,590 | 9/1972 | Bennett........................... | 242/194 |
| 3,716,205 | 2/1973 | Geuder........................... | 242/194 |

*Primary Examiner*—Samuel S. Matthews
*Assistant Examiner*—Alan Mathews
*Attorney, Agent, or Firm*—Wood, Herron & Evans

[57] ABSTRACT

A film cassette of the type where the supply reel and the take-up reel are disposed in coaxial relation. After take-off from the supply reel, the film is directed substantially 360° about the inner periphery of the housing during which it is canted from the supply reel's plane to the take-up reel's plane, the film being exposed while in the same plane as the supply reel. This provides a long, gentle film path with no sharp bends. The guide pins which so direct the film after exposure are fixed, i.e., nonrotating, and are normal to the supply and take-up reels' planes. The majority of the guide pins each present a dish-shaped, inclined bearing surface over which the film passes, the bearing surface extending between the supply and take-up reels and progressing radially outward as it slopes from the supply reel's plane to the take-up reel's plane. This substantially eliminates contact of the film with the guide pins except on the extreme side edges and, in combination with the long, gentle film path, allows the film to seek its own path from the supply reel chamber to the take-up reel chamber. The cassette's cover wall is provided with a series of stub pins about its inner periphery adapted to be received in friction fit relation with axially struck cavities defined by the guide pins. This provides simple means to aid in establishing a light-tight housing.

9 Claims, 5 Drawing Figures

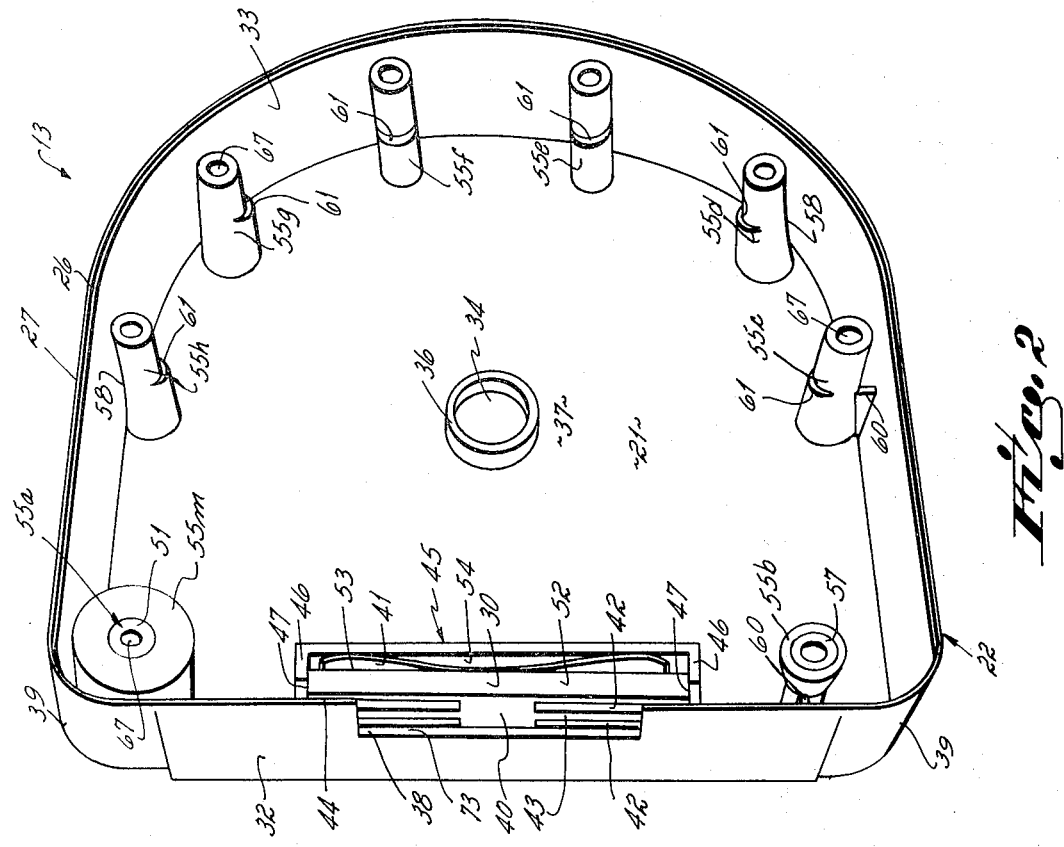
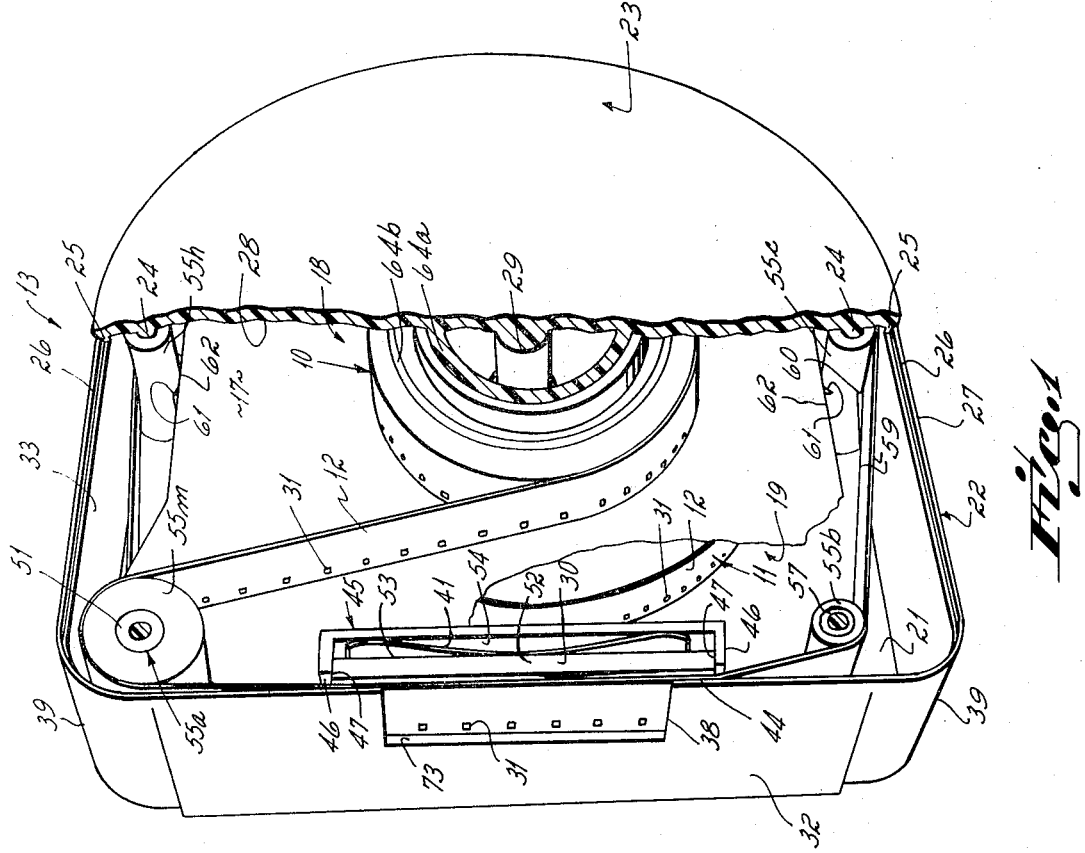

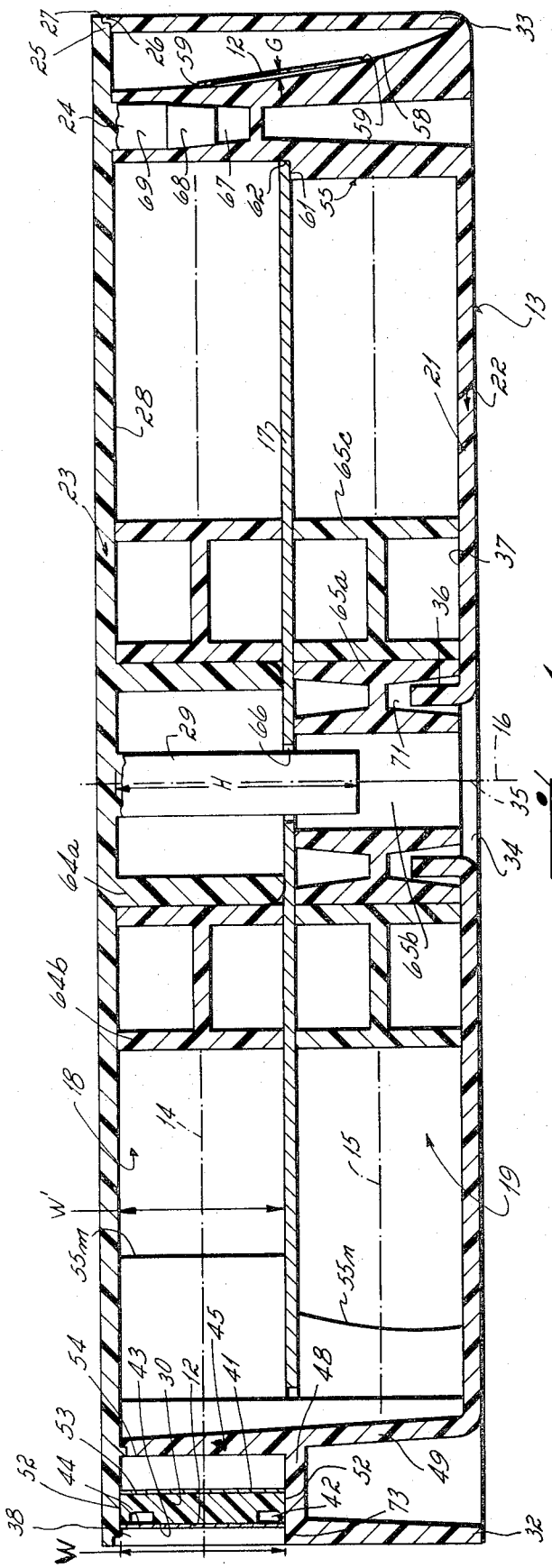

FILM CASSETTE

This invention relates to cassettes or cartridges and, more particularly, relates to a film cassette of the type in which a supply reel and a take-up reel are disposed in coaxial relation.

Film cartridges or cassettes are, of course, well known to the prior art. Such film cassettes are particularly known for use with home type movie cameras, the user simply opening a loading door on the camera and inserting an unexposed film cassette, then exposing the film as desired through use of the camera, and thereafter removing the cassette for film development. This, of course, is of great convenience to the user in that no threading of the film with the camera's drive mechanism is required, and that there is no chance of ruining exposed or unexposed film through inadvertent exposure to light before use or development. Further, film cassettes are also finding a great deal of industrial use. Typically, such industrial use might be in connection with a sequence camera in a bank where the camera is focused over the tellers' stations for surveillance and/or recording of the bank's customers. Such a sequence camera can be easily actuated by a bank teller, or other person, during a robbery to obtain photographs of the robber. Other industrial applications will, of course, suggest themselves to those skilled in the art.

Generally speaking, such film cassettes or cartridges are fabricated from one of two basic structural concepts known to the prior art. The first structural concept involves a supply reel and a take-up reel for the film, the two reels being located in the same plane with the two reel's rotational axes being spaced one from the other. The film is exposed through an exposure aperature in the cassette's housing as it passes, in that single plane, from the supply reel to the take-up reel. This type cassette construction suffers from the disadvantage that a substantial length dimension is required for the cassette to accommodate a relatively large film capacity, e.g., 250 feet or more.

The second structural concept for a film cassette also involves a supply reel and a take-up reel for the film, but these two reels are located in separate parallel planes, i.e., in sandwich fashion, with a common rotational axis for the two reels. That is, the supply reel and the take-up reel are coaxially located relative one to the other, but are in separate planes one from the other. This second structural concept provides a cassette that is more compact and desirable than does the first structural concept (at least from the viewpoint of certain camera designers). Even though the second structural concept establishes a cassette structure that is about double in thickness from that of the first structural concept, the second structural concept establishes a cassette structure that is only about one-half the length of the first structural concept. Generally speaking, in design of the camera itself the larger thickness dimension of the second structural concept can be accommodated much easier than can the larger length dimension of the first structural concept.

Because of the inherent spatial advantages in film cassettes of the type where the supply reel and take-up reel are coaxial with one another, i.e., with cassettes utilizing the second structural concept, quite a bit of development work has been done on such cassette structures in recent years. But one basic problem remains in the design of such cassettes, and that is the problem that arises when exposing the film strip since the film strip must be directed from the supply reel past the exposure aperture onto the take-up reel. This problem arises because the film must be transferred from the plane of the supply reel to the plane of the take-up reel. Guiding elements must be present to direct the film in order to transfer it from the supply reel plane to the take-up reel plane, and such guiding elements often cause buckling, binding, and the like of the film as it is guided from one plane to the other. Such problems typically cause imperfections in the film printout because of scratches and scrapes imparted to the film during the buckling, binding, and the like.

Therefore, it has been one objective of this invention to provide a film cassette of the type where the supply reel and the take-up reel are located in coaxial relation, the film path provided from supply reel through exposure aperture to take-up reel being a long, gentle film path.

It has been another objective of this invention to provide such a film cassette where the guide pins used after exposure of the film are of novel cross-sectional configuration and are stationary, i.e., nonrotating, so as to guide the film by contacting same substantially only at the edges thereof.

It has been a further objective of this invention to provide a film cassette that can be easily, simply, and very quickly loaded and unloaded by an operator without the use of tools simply by frictionally locking the cassette's cover wall with the cassette's guide pin structure, thereby establishing the cover in light-tight relation with the rest of the cassette's housing.

These objectives are attained, in this invention, in a film cassette of the type where the supply reel and the take-up reel are disposed in coaxial relation, the reels being separated by a partition that divides the cassette's housing into a supply chamber and a take-up chamber. In preferred form, the film is withdrawn from the supply reel and directed past an exposure aperture in one side wall of the housing, the aperture being in the same plane as the supply reel. After take-off from the supply reel, the film is directed substantially 360° about the inner periphery of the housing during which it is canted from the supply reel's plane to the take-up reel's plane, the film being exposed while in the same plane as the supply reel. This provides a long, gentle film path with no sharp bends. The guide pins which so direct the film (after it leaves the exposure aperature environment) are fixed, i.e., nonrotating, and are normal to the supply and take-up reels' planes. The majority of the guide pins each present a dish-shaped inclined bearing surface over which the film passes, the bearing surface extending between the supply and take-up reels and progressing radially outward as it slopes from the supply reel's plane to the take-up reel's plane. This substantially eliminates contact of the film with the guide pins except on the extreme side edges and, in combination with the long, gentle film path, allows the film to seek its own path from the supply chamber to the take-up chamber after it leaves the exposure aperature environment. The cassette's cover wall is provided with a series of stub pins about its inner periphery adapted to be received in friction fit relation with axially struck cavities defined by the guide pins, thereby providing simple means to aid in establishing a light-tight housing. A centerpost extending from the cover wall into the cassette's chamber provides an axle for the take-up reel, and also serves to locate that reel and the partition plate in operational relation within the housing. The supply reel hub is molded onto the inner face of the cover wall, and is concentric with the centerpost.

The above objectives, as well as other objectives and further advantages of the invention, will be more apparent from the following detailed description taken in conjunction with the drawings in which:

FIG. 1 is a partially broken away perspective view of a film cassette constructed in accordance with the principles of this invention;

FIG. 2 is a perspective view of the film cassette with cover wall removed, and without supply or take-up reels in place;

FIG. 4 is a cross-sectional view taken along line 4—4 of FIG. 3; and

Figure 3:
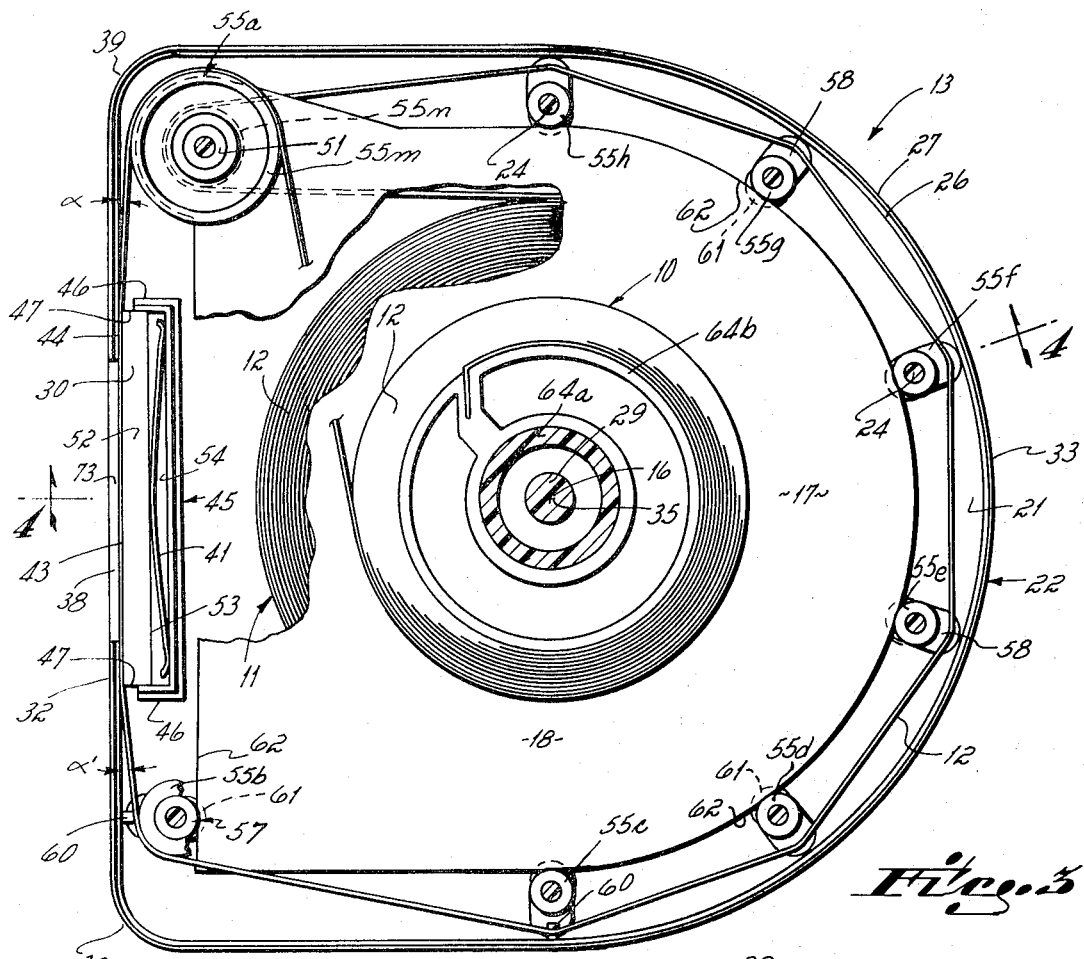
FIG. 3 is a top plan view of the film cassette with the cover wall removed.
Figure 5:
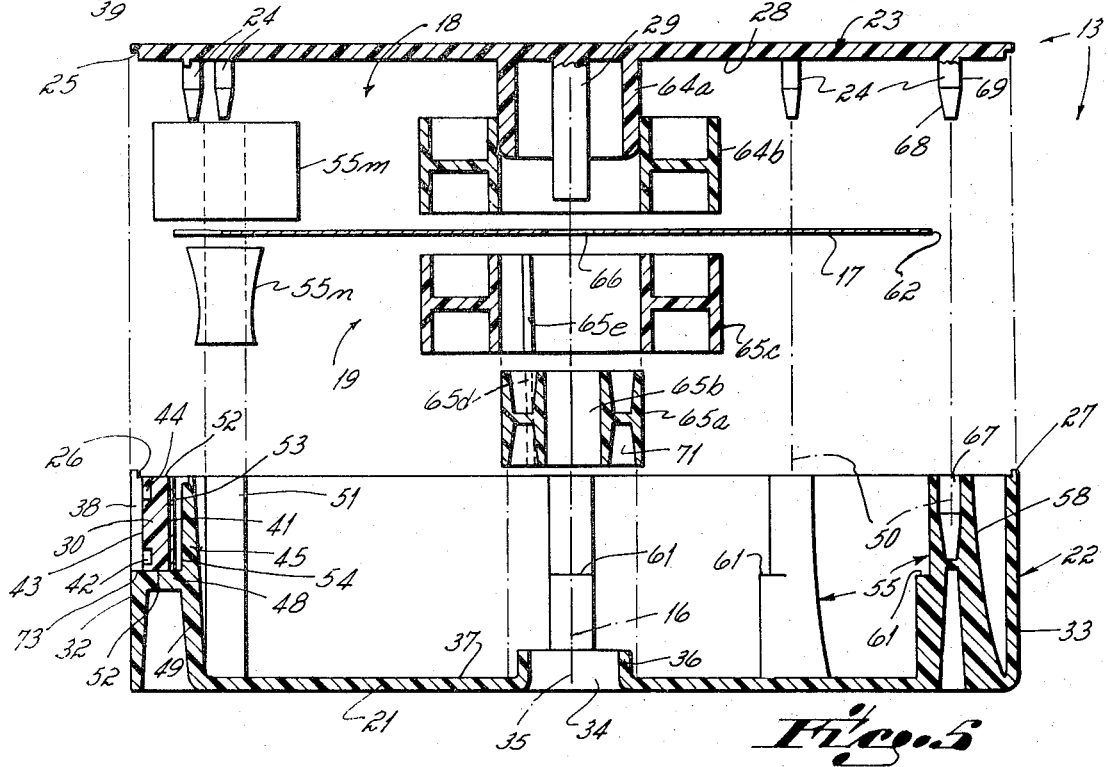
FIG. 5 is a view generally similar to FIG. 4 except that several components have been illustrated in a disassembled or exploded orientation.

The film cassette of this invention is particularly illustrated in the Figures. The film cassette of this invention is particularly adapted for use with the camera illustrated in an application for U.S. Letters Patent entitled CASSETTE TYPE SEQUENCE CAMERA, invented by Warren D. Novak, filed of even date herewith.

As shown in FIGS. 1 and 4, the film cassette is of the type where the supply reel 10 and the take-up reel 11 for the film 12 are disposed in coaxial relation. The reels 10, 11 are positioned within a housing 13 in separate parallel planes (note centerlines 14, 15), thereby establishing a common rotational axis 16 for the two reels. A partition or inner wall 17 separates the supply reel 10 from the take-up reel 11 inside the housing 13, thereby defining a supply chamber 18 and a take-up chamber 19 within the housing.

The cassette's housing 13 is comprised of a main section 22 and a cover wall 23. The cover wall 23 is adapted to fit, by virtue of friction pins 24 (described in detail below), onto the main section 22 to totally enclose the supply and take-up chambers in light-tight relationship relative to the cassette's environment. The friction pins 24, molded integral with the cover wall 23, extend into the interior of the housing 13 when the cover wall and main section 22 are assembled, and are located at the 12, 1, 2, 4, 5, 6, 8 and 11 o'clock positions on the wall's inner face 28 as viewed in FIG. 3. A centerpost 29, also molded integral with the cover wall 23 on its inner face 28, functions as an axle for the take-up 11 reel as described in detail below. Note annular tongue 25 on cover wall 23 that cooperates with annular seat 26 on the main section's rim 27; this structure aids in establishing the light-tight relationship of the cover wall 23 with the main section 22. Solvent or adhesive may be applied to tongue 25 and seat 26, if desired, prior to assembly to insure that the light-tight relationship of the cover wall 23 and main section 22 is not lost during shipment or use.

The main section 22 of the housing 13, as illustrated in FIG. 3, is D-shaped in configuration (to mate with the D-shaped configuration of the cover wall 23) when viewed from a line of sight normal to the planes 14, 15 of supply 10 and take-up 11 reels. The housing's main section 22 includes bottom wall 21 (which is parallel with the cover wall 23 when the cassette is fully assembled), a front wall 32 (which is, in essence, the vertical leg of the D-shaped housing configuration), and side wall 33 (which is basically arcuate in configuration and interconnects the ends of the front wall). The main section's front wall 32 and side wall 33 are molded integral with the bottom wall 21. Note that the bottom wall 21 defines a hole 34 located centrally thereof, the hole's center 35 lying on an extension of the centerpost's axis 16 when the cover wall 23 and main section 22 are assembled. An inwardly turned annular lip 36 (the function of which is described below) is molded integral with the inner face 37 of the bottom wall 21 about the periphery of the hole 34.

The housing's main section 22 also defines an elongated, rectangular exposure aperture 38 in the front wall 32 substantially intermediate the terminal ends 39 of that front wall. The exposure aperture 38 is located in the same plane 14 as the supply reel 10, see FIG. 4. Note particularly that the exposure aperture 38 is of a width W equal to the width W' of the film 12, thereby exposing the film's cog notches 31 through the exposure aperture to a camera's drive sprocket or pawl (not shown). This relationship of the aperture 38 width W to the film width W' also allows the entire film width W' to be exposed through the camera's lens system (not shown).

The exposure aperture 38 is adapted to cooperate with a spring loaded pressure plate 30 maintain the film 12 passing the exposure aperture in exact spatial relation with the camera's lens system (not shown) since, in use, the lens system and exposure aperture will be held in fixed relation with one another. Note recesses 42 defined in the pressure plate's face 43 that are aligned with the line of the film's cog notches 31, thereby allowing the camera's drive sprocket or pawl (not shown) to move the film in known intermittent fashion passed the exposure aperture 38. These recesses 42 terminate short of the plate's center area 40; the film strip is exposed to the camera's lens system (not shown) when it overlies this center area of the pressure plate's face 43. The pressure plate 30 is of rectangular dimensions substantially greater than the rectangular dimensions of the exposure aperture 38 (to prevent the pressure plate from passing through the exposure aperture), and is pressed into contact with the inner face 44 of the main section's front wall that surrounds the exposure aperture by leaf spring 41. The leaf spring 41 is disposed between the pressure plate's rear face 53 and an inner surface 54 of a bracket 45, thereby continuously urging the pressure plate into contact with the inner face 44 of the front wall. The bracket 45, which is molded integral with and extends upwardly from the main section's bottom wall 21, is sized to receive the pressure plate 30 in sliding relation. Sides 46 of the bracket 45 serve to cooperate with the pressure plate's end surfaces 47, and ledge 48 molded integral with the offset web 49 of the main section's front wall 32 in combination with the inner face 28 of the cover wall 23 serve to cooperate with the pressure plate's side surfaces 52, to maintain the pressure plate 30 in immobile position relative to the exposure aperture 38 as the film passes by.

Further in connection with the housing's main section 22, a series of guide pins 55 are disposed about the inner periphery of the main sections' front 32 and side 33 walls. Note that the axis 50 of each guide pin 55 is perpendicular to the planes 14, 15 of the supply 10 and take-up 11 reels, respectively, i.e., is parallel to the plane of the exposure aperture 38. Guide pins 55a, 55b are located at the 11 o'clock and 8 o'clock positions as viewed in FIG. 3. The guide pins 55a, 55b are positioned closely adjacent the inner periphery of the front wall so as to guide the film strip toward and away from the exposure aperture at minimum angles α, α' respectively. Preferably each of these included angles is no greater than about 7°. Guide pin 55a is really a dual purpose guide pin in that the film 12 passes around it twice. This dual purpose guide pin 55a serves to guide the film 12 in the supply reel's plane 14 as it is unwound from the supply reel 10 and directed toward the exposure aperture 38, and also serves to guide the film 12 in the take-up reel's plane 15 as it is directed onto the take-up reel 11 after having traversed pins 55b–h about the inner peripheral path within the housing. Guide pins 55c–55h are located at the 6, 5, 4, 2, 1 and 12 o'clock positions; these pins guide the film 12 from the plane 14 of the supply reel 10 down into the plane 15 of the take-up reel 11 in a long, gentle path by guiding the film around the interior periphery of the housing's side wall 33.

Guide pin 55a is assembled with the housing's main section 22 by slipping the parts 55m, 55n of same over post 51 (molded integral with the main section) part 55n is disposed in a tight friction fit relationship with post 51 so that part 55n never rotates, but part 55m is disposed in a loose friction fit relationship with the post 51 so that part 55m does rotate on occasion. The top or roller section 55m of 11 o'clock guide pin 55a is fabricated of polished chrome, plated brass and is cylindrical in configuration; this is the only film guide surface that is of cylindrical configuration, and it is the only film guide surface in the cassette that is capable of rotation about its post. However, and because of the loose friction fit between the guide pin's roller section 55m and the post 51, rotation of the chrome pin 55m only occurs in times of substantial line tension on the film such as might occur on start up of the camera. Thus, while the 11 o'clock chrome guide pin 55m can rotate on post 51, in practice it only does so incrementally, if at all, at times of high film tension. Note that the top roller section 55m is supported on partition 17 in the supply reel's plane 14, thereby separating parts 55m and 55n of the pin 55a. The part 55n rests on floor 21 and is located in the take-up reel's plane. The part 55n is configured as a truncated pyramid having inwardly dished side walls (in cross section) and is slipped in inverted or nose down fashion in a friction fit relationship sufficient to preclude rotation as same is traversed by the film.

Note the cross-sectional configuration of the 12 o'clock 55h, 1 o'clock 55g, 2 o'clock 55f, 4 o'clock 55e and 5 o'clock 55d pins. These pins 55d–h are molded integral with the main section 22, thereby precluding rotation as the pins are traversed by the film. Each of these guide pins d–h presents a dish-shaped, inclined bearing surface 58 over which the film 12 passes, the bearing surface extending between the supply 14 and take-up 15 reel planes and progressing radially outward as it slopes from the supply reel's plane to the take-up reel's plane. The function of this pin geometry is to assure that the film 12 only touches the guide pins 55d–h at the film edge 59 (see FIG. 4 which illustrates a gap G between the film and the pin 55 as the film traverses that pin). That is, it is desirable that the film not touch the guide pins 55d–h on the emulsion side, or on the side opposite the emulsion side, as such touching tends to scratch and scrape the protective and/or functional coatings on the film. For example, scratching of the film's emulsion side would tend to scratch the emulsion and, thus, mar the final picture. Since film often has a special coating on the opposite side to prevent warping of the film due to difference in coefficient of expansions between the emulsion side and the side opposite, scratching of that special coating could likewise be disadvantageous and result in imperfect photographs.

The 6 o'clock guide pin 55c is configured and molded like guide pins 55d–h, but is only a half pin in that same is integral with a ledge 60 extending out from and molded integral with the main section's side and end walls 33 and 32. The ledge 60 is located in the same plane as partition 17. That is, the film 12 only contacts the top section of pin 55b as same traverses that pin. The 8 o'clock guide pin 55b is also only a half pin that cooperates with a ledge 60 located in the same plane as the partition. However, guide pin 55b is configured like part 55n of guide pin 55a, and is also disposed in inverted or nose down fashion on post 57 in a tight friction fit that precludes its rotation relative to the post.

As mentioned, the supply reel 10 and take-up reel 11 are located in coaxial relationship within the cassette's housing 13. The supply reel 10 is separated from the take-up reel 11 by an inner partition or wall 17. This inner partition 17 is located or positioned within the film cassette by virtue of its geometry, the geometry defining a peripheral lip area 62 about its outer periphery adapted to sit on ledges 61 molded onto the pins 55b–h. This helps to insure that the partition 17 does not flex out of parallelism with the housing's bottom wall 21 and cover wall 23 during use.

The supply reel 10 is provided with a hub 64a molded integral with the inner face of cover wall 23. The hub 64a receives reel 64b (which carries the film 12) in freely rotating relation thereon. The take-up reel 11 is provided with a freely rotating hub 65a having a square bore 65b therein. The hub 65a receives reel 65c (which carries the film 12) in a keyed relation, key 65d on hub 65a being received in keyway 65e in reel 65c, thereby providing an interconnected relation between the hub 65a and reel 65c. The square bore 65b of the take-up reel 11 is exposed through center port 34 in the main section's bottom wall 21, thereby allowing a square drive shaft (not shown) from a camera's slip drive mechanism (not shown) to cooperatively engage the take-up reel's hub 65a and drive the take-up reel. The camera's slip drive mechanism prevents clockspringing of the film on the take-up reel 11 and insures that the exposed film is tightly wound on that reel. Note that only the take-up reel 11 is positively driven, the film 12 being paid off the supply reel 10 only in response to rotation of the take-up reel by the camera's slip drive mechanism (not shown).

The centerpost 29 molded integral with the housing's cover wall 23 is of a height H that allows it, when the cover wall is mounted to the housing's main section 22, to function as a stationary axle on which the take-up reel 11 can rotate, thereby maintaining same in centered relation within the cassette's housing 13. Hub 64a, being fixed to cover wall 23, maintains the supply reel 10 in centered relation within the cassette's housing 13. Further, the centerpost 29 also functions to aid in maintaining the inner partition 17 at its desired position within the housing as same cooperates with center hole 66 in that partition. Because of the inner partition's peripheral geometry and its cooperative relation with guide pins 55a–h, the inner partition 17 does not rotate with rotation of the supply 10 and take-up 11 reels.

As noted, the housing's cover wall 23 is fixed to the housing's main section 22 by friction pins 24 to aid in establishing the light-tight housing 13. The stub or friction pins 24 cooperate with cavities 67 struck or molded axially into the top of each pin 55 and the post 51. That is, each pin 55 and post 51 is provided with a recess 67 adapted to receive the stub pins 24 in a tight, friction fit relationship. Each friction or stub pin 24 is tapered at the exposed end as at 68, that taper terminating in a shank portion 69 having an outer diameter substantially equal to the inner diameter of the cylindrical recess 67 provided in the top of each pin 55 and post 51. Thus, and after the take-up reel 11 and the supply reel 10 have been located within the housing's main section 22, the cover wall 23 is located in place relative to the main section's side wall 33 and front wall 32 simply by depressing the stub pins 24 into the recesses 67 provided by the guide pins 55 and posts 51. Note also that the pins 55 and the posts 51, 57 are of a height that allows them to span between the inner surfaces 28, 37 of the cover wall 23 and the bottom wall 21, respectively. Thus, the posts 51, 57 and the guide pins 55, also serve to structurally reinforce the cassette's housing 13 from the interior thereof.

In connection with the drive shaft port 34 provided in the main section's bottom wall 21, note that the annular lip 36 cooperates with an annular seat 71 defined in the take-up reel's hub 65a when the supply reel 10, take-up reel 11, and inner partition or plate 17 are positioned within the housing 13. This annular lip/hub structure provides a light-tight fit for the drive shaft port 34 that allows the take-up reel 11 to be driven by the camera's drive mechanism (not shown) located exteriorly of the cassette.

In use, and in connection with the long, gentle travel path of the film 12 as it progresses from the supply reel 10 past the exposure aperture 38 and onto the take-up reel 11, note particularly FIGS. 1 and 3. As is shown in those Figures, and when the film cassette is viewed from a line of sight normal to and above the plane of the supply 10 and take-up 11 reels with the supply reel 10 positioned above the take-up reel 11, the film is unwound from the supply reel in a clockwise manner and is rewound on the take-up reel also in a clockwise manner. Initially the film is withdrawn or paid off the supply reel 10 in a path substantially parallel to the plane of the exposure aperture 38, and is directed upwardly and around the dual purpose guide pin 55a; the dual purpose guide pin is so positioned relative to the exposure aperture 38, and pressure plate 30, as to provide a minimum angle α of entry for the film into the exposure aperture area of the cassette. The film 12 then passes the exposure aperture 38 where it is urged into correct focal relation with the camera's lens system (not shown) by the spring 41 loaded pressure plate 30. As the film passes the exposure aperture it is guided therethrough by rails 73 defined by the cover wall 23 and the ledge 48, such rails insuring that after passing the exposure aperture 38, the film is directed around 8 o'clock guide pin 55b toward 6 o'clock guide pin 55c. The location of 8 o'clock pin 55b closely adjacent the housing's front wall 32 provides a minimum exit angle α' for the film. The minimum entry α and exit α' angles insure that fluctuations in the focal distance between the film and the camera's lens system due to high line tension (which might occur from fluttering of the pressure plate 30) will not occur. Note that as the film passes the guide pins 55b, 55c it is directed over guide ledges 60 prior to being directed toward guide pin 55d. Thus, cooperation of the partition 17, the guide rails 73 adjacent the exposure aperture 38, and the guide ledges 60 assures that the travel path of the film will remain in the plane 14 of the supply reel 10 itself as the film leaves the supply reel and as it traverses the exposure aperture 38. Since the exposure aperture 38 in the main section's front wall 32 is in the same plane as the supply reel 10 itself, this insures that no undue forces or stresses will be imparted to the film which would tend to misalign it with the exposure aperture as it passes the exposure aperture.

After the film 12 has passed the 6 o'clock guide pin 55c, the film tends to seek its own path as it traverses the guide pins 55d–h,a in sequence until it is directed onto the take-up reel 11. That is, as the film traverses guide pins 55d–h,a it is canted from the supply reel's plane 14 to the take-up reel's plane 15 but such a change of planes is achieved without special forces (such as might be established by positioning rollers or ribs or guideways, or the like) being exerted on the film to cause it to change planes. The film then is directed around lower portion 55n of dual purpose guide pin 55a, and then doubled back onto the take-up reel 11; the path of the film from the pin 55a to the reel 11 being approximately transverse to the plane of the exposure aperture. Note particularly that the 11 o'clock pin 55a effectively guides the film off the supply reel 10 toward the exposure aperture 38 above the inner partition 17 at the start of its travel path, and also guides the film at the end of its travel path back onto the take-up reel beneath the partition wall. Thus, the film is canted and shifted from alignment with the film supply chamber 18 to the film take-up chamber 19, i.e., from the plane 14 of the supply reel 10 to the plane 15 of the take-up reel 11, by traversing substantially 360° about the inner periphery of the film cassette past fixed pins 55a–h,a (in that order) to provide a long, gentle film path with no sharp bends after exposure through exposure aperture 38.

Having described in detail the preferred embodiment of my invention, what I desire to claim and protect by Letters Patent is:

1. A film cassette comprising
   a supply reel and a take-up reel, said reels being disposed in coaxial relation and parallel one to the other,
   a housing within which said reels are positioned, said housing defining an exposure aperture in the front wall thereof past which the film moves as it is wound onto the take-up reel from the supply reel, the exposure aperture being positioned in the plane of said supply reel, and the takeoff of the film from said supply reel being adjacent the exposure aperature, and
   a series of guide pins perpendicularly disposed relative to the supply and take-up reels about the inner periphery of said housing, said guide pins cooperating to define a path for the film from the supply reel to the take-up reel that requires the film to proceed substantially 360° around the inner periphery of said housing, the majority of said guide pins being stationary, and being provided with a bearing surface over which the film passes that extends between the supply reel and take-up reel planes and that progresses radially outward relative to said housing as it slopes from the supply reel's plane to the take-up reel's plane, the bearing surface also presenting a dish-shaped cross section which substantially eliminates contact of the film with the guide pins except on the side edges thereof, such a guide pin configuration, in combination with the substantially 360° film travel path, allowing the film to make its own path from said supply reel to said take-up reel after passing the exposure aperture.

2. A film cassette as set forth in claim 1 wherein said housing includes
a main section having a floor,
a cover wall, said guide pins being fixed to one of said cover wall and said floor,
a series of friction pins fixed to the other of said cover wall and said floor, and
structure defining cavities at the free end of said guide pins, said cavities being sized to receive said friction pins in friction fit relation for establishing a friction fit between said main section and cover wall to aid in establishing a light-tight housing.

3. A film cassette as set forth in claim 2 wherein said main section includes side walls that define a seat along the top edge thereof, said cover wall being received within that seat in light-tight relation, and said guide pins being sized to provide structural support to said cover wall in addition to that provided by said side walls.

4. A film cassette as set forth in claim 1 wherein one of said guide pins is adapted to guide the unexposed film off said supply reel toward said exposure aperture and also to guide the exposed film onto said take-up reel.

5. A film cassette as set forth in claim 1 including
a nonrotative interior wall positioned between said supply and take-up reels to define a supply reel chamber and a take-up reel chamber inside said housing, said interior wall being sized to cooperate with said guide pins for locating same within said housing.

6. A film cassette comprising
a supply reel and a take-up reel, said reels being disposed in coaxial relation and parallel one to the other,
a housing within which said reels are positioned, said housing including a cover wall and a main section having a floor,
a series of guide pins perpendicularly disposed relative to the supply and take-up reels about the inner periphery of said housing, said guide pins extending from sand being fixed to one of said cover wall and said main section, and said guide pins being sized to provide structural support for said cover wall to maintain said cover wall and floor in that definite spatial relationship where said cover wall is retained parallel to said floor,
structure defining cavities at the free ends of said guide pins, and
a series of friction pins extending perpendicularly from the other of said cover wall and said floor, said friction pins being received in said cavities defined by said guide pins in a friction fit relationship, thereby establishing a friction fit between said main section and cover wall to aid in establishing a light-tight housing.

7. A film cassette as set forth in claim 6 wherein said main section includes side walls that define a seat along the top edge thereof, said cover wall being sized to fit within said seat in friction fit and light-tight relationship.

8. A film cassette comprising
a supply reel and a take-up reel, each of which includes a mounting hub, said reels being disposed in coaxial relation and parallel one to the other, and the film carried by each of said reels being wound upon a mounting hub,
a housing within which said reels are positioned, said housing including a cover wall and a main section having a floor,
a separate interior wall positioned between said supply and take-up reels to define a supply reel chamber and a take-up reel chamber inside said housing,
a bearing hub fixed to said cover wall, said bearing hub serving as an axle for one of said mounting hubs, that one of said mounting hubs being rotatable relative to said bearing hub,
a spacing hub located on said floor and being rotatable relative thereto, the other of said mounting hubs being fixed relative to said spacing hub,
structure defining a multi-sided bore in said spacing hub,
structure defining a hole in said floor that permits access of a driveshaft into said bore, and
a centering post fixed to said cover coaxially with said bearing hub and extended through said interior wall into said multi-sided bore, said centerpost aligning said reels in coaxial relation within said housing.

9. A film cassette as set forth in claim 8 including
a lip fixed to said floor that is concentric with the hole in said floor, said lip extending inwardly into said housing, and
structure defining a seat in said spacing hub, said seat receiving said lip to establish a light-tight relation between the interior of said housing and said multi-sided bore.

* * * * *